(12) United States Patent
Krapf et al.

(10) Patent No.: US 9,827,927 B2
(45) Date of Patent: Nov. 28, 2017

(54) DEVICE FOR TRANSMITTING ELECTRICAL CURRENT AND/OR SIGNALS IN A MOTOR VEHICLE

(71) Applicant: NEXANS, Paris (FR)

(72) Inventors: Stefan Krapf, Flossenburg (DE); Frank Schroer, Weiden (DE); Andreas Pedimonte, Weiden (DE)

(73) Assignee: NEXANS, Paris (FR)

( * ) Notice: Subject to any disclaimer, the term of this patent is extended or adjusted under 35 U.S.C. 154(b) by 323 days.

(21) Appl. No.: 14/619,473

(22) Filed: Feb. 11, 2015

(65) Prior Publication Data

US 2015/0232046 A1    Aug. 20, 2015

(30) Foreign Application Priority Data

Feb. 18, 2014    (EP) .................................... 14305216

(51) Int. Cl.
  *B60R 16/027*    (2006.01)
  *H01R 35/02*    (2006.01)
(52) U.S. Cl.
  CPC ......... *B60R 16/027* (2013.01); *H01R 35/025* (2013.01); *H01R 2201/26* (2013.01)
(58) Field of Classification Search
  CPC .............................. B60R 16/027; H01R 35/04
  See application file for complete search history.

(56) References Cited

U.S. PATENT DOCUMENTS

2010/0143101 A1\* 6/2010 Fang ...................... F16J 15/445
                                                                415/173.1

FOREIGN PATENT DOCUMENTS

| JP | H02138889 | 11/1990 |
| JP | H0917541 | 1/1997 |
| JP | H9-171870 | \* 6/1997 |
| JP | H09171870 | 6/1997 |

OTHER PUBLICATIONS

Translated portion of JPH9-171870.\*
Search Report dated 2014.

\* cited by examiner

*Primary Examiner* — Jeffrey Shin
(74) *Attorney, Agent, or Firm* — Sofer & Haroun, LLP

(57) ABSTRACT

A device (1) for transmitting electrical current and/or signals in a motor vehicle is proposed. The device (1) has a wind up spring cassette (2) composed of a stator (4) and a rotor (5) in which at least one line (7) extending in windings is connected with one end thereof to the stator (4) and with the other end to the rotor (5), and at least one fixing element (3) through which a predetermined relative position for the mounting of the wind up spring cassette (2) into the motor vehicle is fixed. The fixing element is a foil like label (3) which is attached to the outside of the wind up spring cassette (2) and extends from the rotor (5) to the stator (4). The label (3) is inseparably mechanically secured at the stator (4) as well as at the rotor (5).

2 Claims, 1 Drawing Sheet

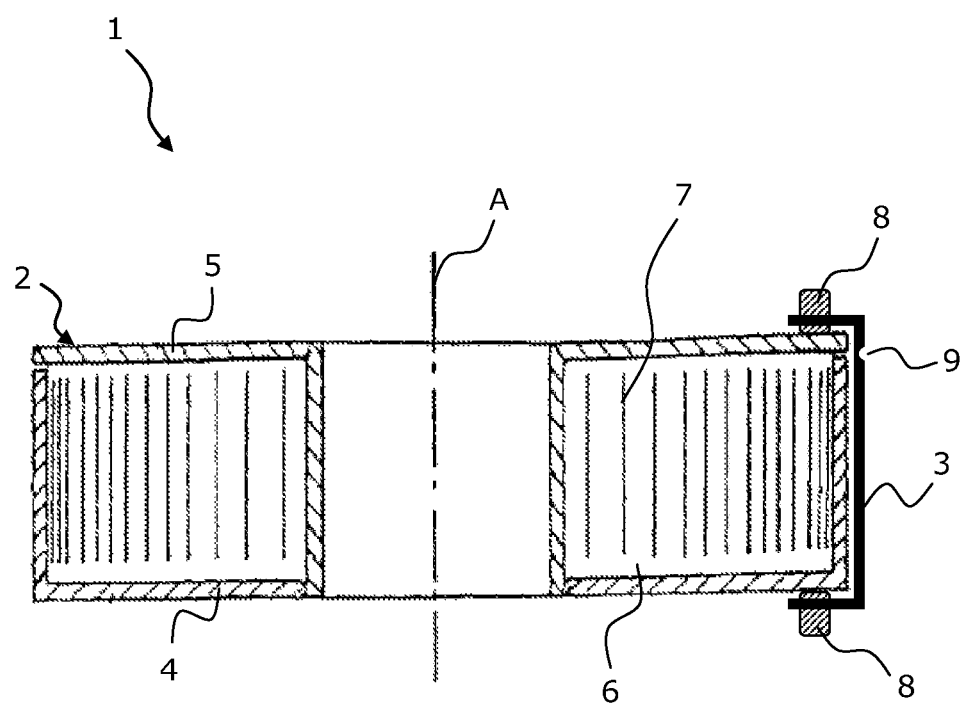

DEVICE FOR TRANSMITTING ELECTRICAL CURRENT AND/OR SIGNALS IN A MOTOR VEHICLE

RELATED APPLICATION

This application claims the benefit of priority from European Patent Application No. 14 305 216.5, filed on Feb. 18, 2014, the entirety of which is incorporated by reference.

BACKGROUND

Field of the Invention

The invention relates to a device for transmitting electrical current and/or signals in a motor vehicle, wherein the device has a wind up spring cassette consisting of a stator and a rotor, and at least one fixing element through which the relative positions of the stator and the rotor of the wind up spring cassette are fixed in the wind up spring cassette in the steering wheel of the motor vehicle. In the wind up spring cassette, at least one line extending in windings is arranged which is connected with one end to the stator and with the other end to the rotor.

Description of Related Art

Wind up springs are preferably used today in motor vehicles for transmitting electrical or optical signals, for example, for triggering the air bag in the steering wheel, between stationary and moveable motor vehicle parts. The line may comprise electrical and/or optical lines. Wind up springs ensure a secure and permanent electrical and/or optical connection. Wind up springs are called lines which are wound within the cassette either spirally in concentric windings for winding a core in the cassette, or are in a loop guided around a core in the cassette (the latter also being called short strip winding spring or U-turn winding spring). With its two ends, the line connects a structural component (the rotor) rotatable with the steering wheel to a structural component (the stator) fixed to the motor vehicle optically and/or electrically to each other. Wind up springs permit a relative rotational movement of the stator and of the rotor without impairing the secure electrical and/or optical connection between vehicle components which are fixed relative to the vehicle and steering wheel. The line may be, for example, a flexible flat band line (FBL), i.e. conducting webs which are embedded in the insulating material at a distance from each other. The rotor and the stator together form a housing which receives the line, which is also called the wind up spring cassette.

For mounting the wind up spring cassette in the steering wheel of a motor vehicle, it is important that the two ends of the FBL or of another line assume a certain position relative to each other. This ensures that the predetermined rotations of the rotor can be carried out in both directions of the steering wheel without the line tearing from the cassette.

DE 42 16 526 A1 describes an electrical line extending in windings accommodated in a circular cassette, wherein the cassette is composed of a rotor rotatable about the axis of the cassette, and a stator. In order to hold the two components in a certain position during mounting in the steering wheel of a motor vehicle, an outwardly projecting attachment is provided on the rotor for receiving a screw and a spring adjustable by means of the screw. In the mounted position of the cassette, a spring is pressed into a recess of the stator, so that the rotor immovably rests against the stator. In the position of operation, the locking action is removed by loosening the screw.

OBJECTS AND SUMMARY

The invention is based on the object of making available an improved device for transmitting an electrical current and/or signals in a motor vehicle which includes a stator and a wind up spring cassette composed of a rotor and, at least one fixing element, which can be realized easily, quickly and inexpensively and in which the wind up spring cassette components are secured safely relative to each other.

In accordance with the invention, this object is met in that the fixing element is a
- foil like label which is mounted on the outside of the wind up spring cassette, and which extends from the rotor to the stator, and
- that the label is secured mechanically irremovably from the stator as well as the rotor.

The device according to the invention permits the fixing of the stator and the rotor in the predetermined positions relative to each other for mounting the wind up spring cassette in the steering wheel. This assembly position or center position ensures that the line is not damaged or otherwise negatively affected in the position of operation. The irremovable mechanical connections between the label and the rotor or the stator make the connections particularly secure and also permanent over longer periods of time as well as over longer periods of time in storage or being transported. In contrast to a simple adhesive label, there is no danger of separation because the mechanical connection of the label is permanent, even under the different environmental influences and is practically not subject to aging phenomena. The foil like label is an element which is commercially available and which, in comparison to other machine made securing elements, is relatively inexpensive. The mechanical attachment of the label to the stator and to the rotor can take place automatically, for example, by riveting or welding, so that the device according to the invention can be manufactured in a particularly simple manner. In the operating position, the label is torn up after mounting of the wind up spring cassette during the first rotational movement of the steering wheel and, thus, of the rotor. No harmful elements which could impair the function of the wind up spring remain because the two parts of the label are each permanently attached to the rotor or the stator. The mechanical connection of the label, therefore, remains permanently attached well beyond the required duration for the attachment of the label.

BRIEF DESCRIPTION OF THE DRAWINGS

The device according to the invention will now be explained with the aid of the drawings.

FIG. 1 is a schematic sectional view of a device according to the invention in accordance with an embodiment.

DETAILED DESCRIPTION

The device 1 for transmitting electrical current and/or signals in a motor vehicle includes a wind up spring cassette 2 and a foil like label 3 attached to the cassette. Although the drawings only illustrate a label 3, the device according to the invention 1 can also include several labels which are, for example, uniformly distributed and attached over the circumference of the wind up spring cassette 2.

The wind up spring cassette 2 consists of a stator 4 and a rotor 5 which is rotatable relative to the stator 4 about the axis A of the wind up spring cassette. In the winding space 6 defined by the stator 4 and the rotor 5, at least one line 7, for example, an FBL of which only several windings are schematically illustrated, is accommodated. The line 7 is connected with one end to the stator 4 and with another end to the rotor 5 in the conventional manner. The wind up spring cassette 2 is intended for mounting in the steering wheel of the motor vehicle, wherein the rotor 5 is rotatable relative to the steering wheel, and thus, relative to the stator 4 which is fixed relative to the motor vehicle.

The foil like label 3 holds the wind up spring cassette 2 in an assembly position for mounting in the steering wheel of the motor vehicle. In the assembly position, the stator 4 and the rotor 5 of the wind up spring cassette 2 are fixed by the label 3 in a predetermined position relative to each other. The label 3 is attached to the wind up spring cassette 2 at the outer surface thereof in such a manner that it extends over the rotor 5 as well as over the stator 4, as illustrated in FIG. 1. The label 3 is mechanically attached permanently and inseparably to the stator 4 as well as to the rotor 5. The fastening points 8 schematically illustrated in FIG. 1 can be realized, for example, by welding points, by clamping disks or rivets attached respectively to the stator 4 and the rotor 5. In accordance with a preferred embodiment, a thermoplastically deformable rivet bolt is used for this purpose. By being permanently mechanically attached, the label 3 is inseparably connected to the wind up spring cassette 2 and thereby guarantees that the center position is maintained during mounting in the steering wheel.

The label 3 may be composed, for example, of polyethylene. Moreover, the label 3 may be coated on its back side with adhesive, so that it can be glued, in addition to the mechanical attachment, to the stator 4 and at the rotor 5 of the wind up cassette 2. The width of the label 3 is such that the stator 4 and the rotor 5 can be fixed securely in the assembled position without accidently tearing the label 3 (perpendicularly to the plane of the drawing in FIG. 1).

After mounting of the wind up spring cassette 2 in the steering wheel of the motor vehicle, the wind up spring cassette 2 is placed in the mounting position by tearing the foil like label 3 during the first rotational movement of the steering wheel, so that the stator 4 and the rotor 5 are rotatable relative to each other. A portion of the label 3 always remains attached at the stator 4 or the rotor 5. In the preferred embodiment of the device 1 according to the invention, the label 3 has an intended breaking point 9 so that the label 3 is torn at the intended breaking point 9 during the rotational movement of the rotor 5. The intended breaking point 9 is preferably located in the immediate vicinity of the transition point between stator 4 and rotor 5, as illustrated in FIG. 1, so that the parts of the label 3, in the operating position of the wind up spring cassette 2, cannot impede the rotation of the rotor 5.

The invention claimed is:

1. Device for transmitting electrical current and/or signals in a motor vehicle, said device comprising:
    a wind up spring cassette having a stator and a rotor, in which at least one line extending in windings is connected with one end thereof to the stator and with the other end to the rotor,
    wherein the wind up spring cassette has at least one fixing element through which a relative position predetermined by the mounting of the wind up spring cassette into the motor vehicle is fixed,
    wherein the fixing element is a foil label which is attached at the outside of the wind up spring cassette and extends from the rotor to the stator,
    wherein thermoplastically deformable rivet bolts are arranged on fastening points of the stator and the rotor, and
    wherein the label is inseparably mechanically attached to the rivet bolts through rivets or clamping disks.

2. Device according to claim 1, wherein the label has an intended breaking point, so that the label is torn at the intended breaking point upon the rotational movement of the rotor.

\* \* \* \* \*